US 6,645,106 B2

(12) United States Patent
Goo

(10) Patent No.: US 6,645,106 B2
(45) Date of Patent: Nov. 11, 2003

(54) TRANSMISSION FOR PERFORMING RELIABLE CONTINUOUSLY-VARIABLE-SPEED OPERATION THROUGH GEAR MESHING, AND VEHICLE-USE CONTINUOUSLY-VARIABLE TRANSMISSION DEVICE USING IT

(76) Inventor: Teak-Seo Goo, 568-7 (3/1), Hockik-dong, Nam-gu, Incheon-shi (KR)

( * ) Notice: Subject to any disclaimer, the term of this patent is extended or adjusted under 35 U.S.C. 154(b) by 0 days.

(21) Appl. No.: 10/111,239
(22) PCT Filed: Aug. 22, 2001
(86) PCT No.: PCT/KR01/01421
§ 371 (c)(1),
(2), (4) Date: Apr. 22, 2002
(87) PCT Pub. No.: WO02/16802
PCT Pub. Date: Feb. 28, 2002

(65) Prior Publication Data
US 2003/0004030 A1 Jan. 2, 2003

(30) Foreign Application Priority Data
Aug. 22, 2000 (KR) .................................. 2000-48778

(51) Int. Cl.⁷ .............................................. F16H 47/04
(52) U.S. Cl. ........................................ 475/72; 475/340
(58) Field of Search ............................. 475/1, 5, 6, 72, 475/74, 91, 207, 211, 215, 340

(56) References Cited

U.S. PATENT DOCUMENTS

| 1,530,967 | A | * | 3/1925 | Williams | 475/72 |
| 2,603,111 | A | * | 7/1952 | Madsen | 475/91 |
| 4,815,334 | A | * | 3/1989 | Lexen | 475/72 |
| 5,496,223 | A | * | 3/1996 | Jarchow | 475/72 |
| 5,584,772 | A | * | 12/1996 | Hayd | 475/72 |
| 6,338,689 | B1 | * | 1/2002 | Pollman | 475/72 |

FOREIGN PATENT DOCUMENTS

| JP | 58119122 | 6/1983 |
| JP | 08182710 | 6/1996 |
| KR | 97-45324 | 8/1997 |
| KR | 97-058590 | 11/1997 |
| KR | 98-36378 | 9/1998 |
| WO | WO99/24736 | 5/1999 |

* cited by examiner

Primary Examiner—Sherry Estremsky
(74) Attorney, Agent, or Firm—Grossman, Tucker, Perreault & Pfleger, PLLC

(57) ABSTRACT

A transmission for performing a reliable continuously-variable-speed operation by using gear meshing with a minimized power loss, and a vehicle-use continuously-variable transmission device that uses it to provide a continuously-variable-speed change ratio optimal for an engine output; specifically, a dual continuously-variable transmission device for effecting a secondary speed change of increasing or decreasing an output-speed increasing ratio when the rotating speed of a turbine shaft is increased or decreased with the rotation speed of a sub-drive speed-change sun gear fixed. Since a distributed torque is synthesized during is applied to automobiles to provide elaborately, flexibly and in real time a speed change ratio which is obtained by computing an engine output, a car speed, a throttle opening ratio, a variable-speed sun gear rotating speed, and a brake pressure by using a controller (TCU), is changed in a time-transforming way, and is optimum for running conditions and road condition, thereby saving on fuel, enhancing an out put, decreasing soot and smoke and noise, and yet ensuring a comfortable running.

22 Claims, 6 Drawing Sheets

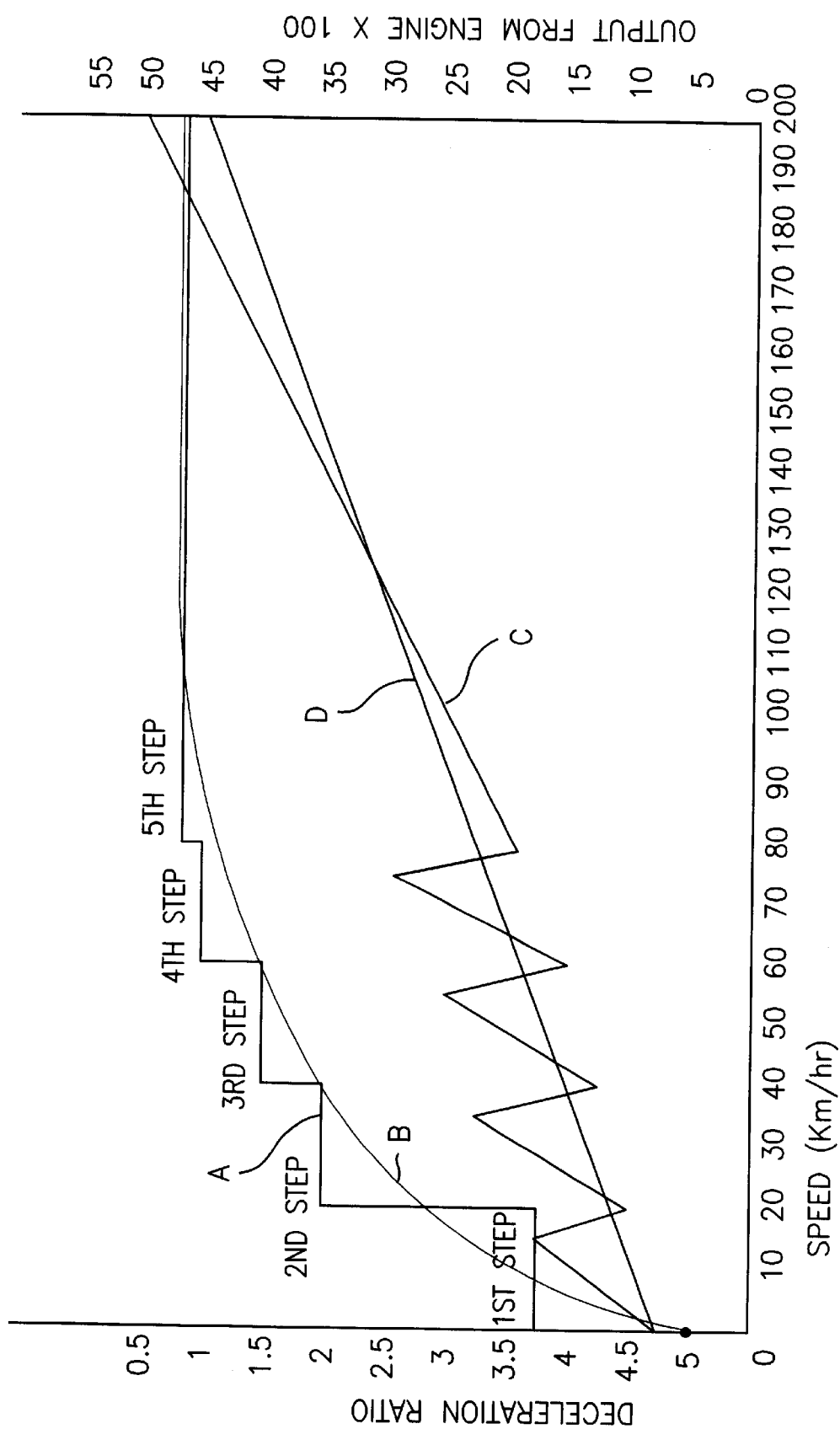

TRANSMISSION FOR PERFORMING RELIABLE CONTINUOUSLY-VARIABLE-SPEED OPERATION THROUGH GEAR MESHING, AND VEHICLE-USE CONTINUOUSLY-VARIABLE TRANSMISSION DEVICE USING IT

TECHNICAL FIELD

The present invention relates to a continuously variable transmission to minimize a dynamic power loss through a gear mesh and to a method for engaging gears for a continuously variable transmission. Particularly, the present invention relates to a vehicle transmission, which has the continuously variable speed with an optimized transmission rate of dynamic power in a combustion engine.

BACKGROUND ART

A plurality of continuously variable transmission techniques have been proposed and these can be classified into mechanical, electrical and hydraulic methods.

A friction member, a belt or a chain has mechanically implemented the continuously variable transmission for vehicles. However, this mechanical transmission has several disadvantages as illustrated below.

First, in case where the friction is employed, power loss is caused by the power failure when the surface of the friction member is worn away and an alien substance is introduced thereto. Second, in case of the belt, if the tension of the belt is low, the slip is caused and, if the tension of the belt is high, overload is imposed on the belt and power loss is also caused by the introduce of an alien substance between a pulley and the belt, thereby forming the slip. Third, in case of the chain, the speed change is continuously achieved; however, a crashing sound is generated by a discontinuous contact between a pulley the chain and the increase of centrifugal force due to the weight of the chain makes maximum speed and large scale limited.

On the other hand, the techniques of the continuously variable transmission using the gear mesh are disclosed in Korean patent application Nos. 97-45324 (entitled, "continuously variable transmission"), 97-58590 (entitled, "vehicle transmission") and 98-36378 (entitled, "continuously variable transmission and vehicle transmission using the same") by Teak-Seo Goo, who is also the inventor of the present invention. However, these techniques have still limitations in power loss and cost because of a complicated gear mesh.

DISCLOSURE OF INVENTION

An object of the present invention is to provide a continuously variable transmission to minimize power loss through a gear mesh.

Another object of the present invention is to provide a vehicle transmission to minimize power loss through a gear mesh in a simple structure.

Also, another object of the present invention is to provide a method for meshing gears for a continuously variable transmission which is capable of controlling moving transporters forward and reward through a gear mesh.

In accordance with an aspect of the present invention, there is provided a continuously variable transmission in which a rotation power is transmitted with non-step from an input shaft to an output shaft, comprising: a) a carrier means engaged with said input shaft, wherein said carrier means rotates by a turbine shaft; b) a plurality of sets of planetary gears supported by said carrier means, wherein said planetary gear sets freely rotate in one body and wherein the number of teeth of one of said planetary gear set is smaller than that of the other of said planetary gear set; c) a first output means meshed with said planetary gears having the large number of teeth at an outside thereof; d) a second output means meshed with said planetary gears having the large number of teeth at an inside thereof; and e) a transmission means meshed with said planetary gears having the small number of teeth at an inside thereof and rotating by a subsidiary driving force in the same direction as said carrier means with a speed change, whereby a main driving force inputted into the input shaft is outputted with non-step through a gear mesh.

The input shaft is mechanically connected to said carrier means through a spline and the first output means includes: a ring gear meshed with said planetary gears having the large number of teeth at an outside thereof; and a forward clutch connecting said ring gear to said output shaft. The second output means includes: a reverse sun gear meshed with said planetary gears having the large number of teeth at an inside thereof; and a reverse clutch connecting said reverse sun gear to said output shaft. Also, the transmission means includes: a transmission sun gear meshed with said planetary gears having the small number of teeth at an inside thereof; and a hydraulic motor providing a subsidiary driving force to make said transmission sun gear rotate in the same direction as said carrier means or make said transmission sun gear rotate stop.

The transmission means is positioned between said input and output shafts in order that a speed change is achieved by a rotation speed of said hydraulic motor at a forward rotation of said first output means, and the transmission means is positioned between said input and output shafts in order that a constant speed is maintained through a stop of both said hydraulic motor and said transmission sun gear at a reverse rotation of said second output means. Further, the first output is engaged with said output shaft in order that a main driving force from said input shaft and a subsidiary driving force from said planetary gears combined with a change of speed.

The transmission sun gear is meshed with said planetary gears having the small number of teeth in order that said transmission sun gear rotates by both a rotation power which is caused by said planetary gears in the same direction and a rotation power which is caused by said hydraulic motor.

In accordance with another aspect of the present invention, there is provided a continuously variable transmission for a vehicle, wherein said vehicle comprising a power generation means, a hydraulic means, a wheel driving means, a control means to control said vehicle, said continuously variable transmission comprising: a) a carrier means engaged with a turbine shaft, wherein said carrier means rotates by said turbine shaft; b) a plurality of sets of planetary gears supported by said carrier means, wherein said planetary gear sets freely rotate in one body and wherein the number of teeth of one of said planetary gear set is smaller than that of the other of said planetary gear set; c) a first output means meshed with said planetary gears having the large number of teeth at an outside thereof; d) a second output means meshed with said planetary gears having the large number of teeth at an inside thereof; and e) a transmission means meshed with said planetary gears having the small number of teeth at an inside thereof and rotating in the same direction as said carrier means.

In accordance with still another aspect of the present invention, there is provided a method for meshing gears for a continuously variable transmission in which a rotation power is transmitted with non-step from an input shaft to an output shaft, the method comprising the steps of: a) engaging a carrier means with said input shaft, wherein said carrier means rotates by a turbine; b) providing a plurality of sets of planetary gears supported by said carrier means in order that said planetary gear sets freely rotate in one body, wherein the number of teeth of one of said planetary gear set is smaller than that of the other of said planetary gear set; c) providing a first output means meshed with said planetary gears having the large number of teeth at an outside thereof; d) providing a second output means meshed with said planetary gears having the large number of teeth at an inside thereof; and e) providing a transmission means meshed with said planetary gears having the small number of teeth at an inside thereof and rotating in the same direction as said carrier means.

BRIEF DESCRIPTION OF DRAWINGS

Other objects and aspects of the invention will become apparent from the following description of the embodiments with reference to the accompanying drawings, in which:

FIG. 4 is a graph for comparing the operating characteristics of the transmission for vehicles according to the present invention with those of conventional transmissions.

BEST MODE FOR CARRYING OUT THE INVENTION

Hereinafter, in order that those who have ordinary skill in the art to which the subject matter pertains make and use the present invention, preferred embodiments of the present invention will be described in detail below.

Figure 1:
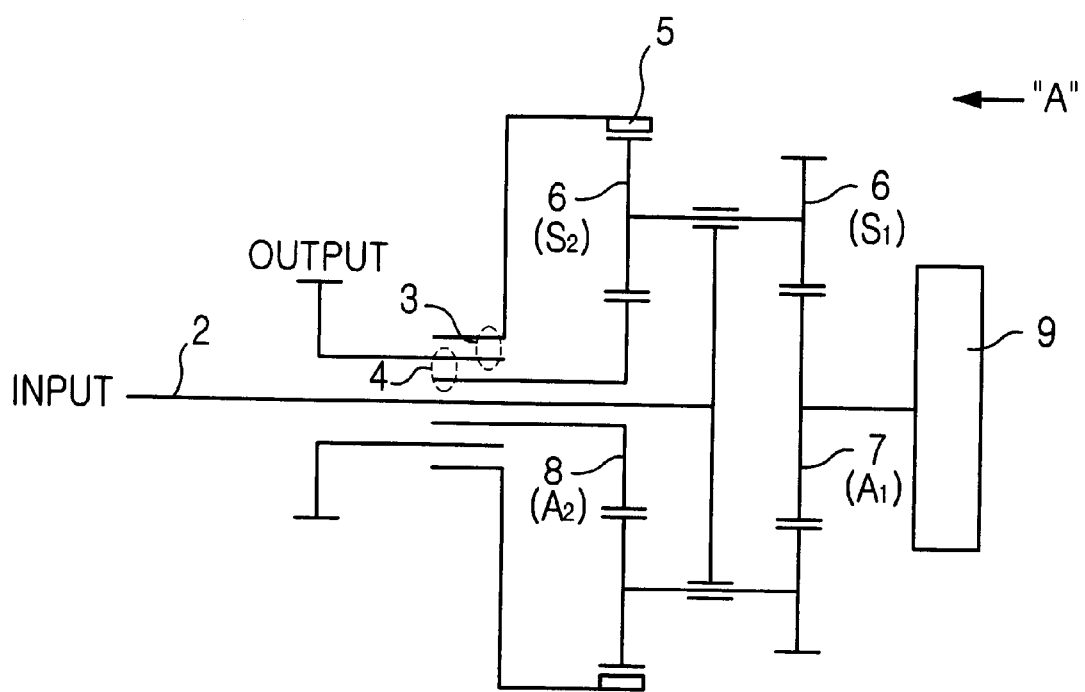
FIG. 1 is a schematic view illustrating a gear mesh of a transmission according to the present invention.

FIG. 1 is a schematic view illustrating a gear mesh of a transmission according to the present invention.

Referring to FIG. 1, a planetary gear mesh of the transmission according to the present invention is novel and it is called "GTS gear mesh" hereinafter, being different from conventional Ravigneaux Gears and Simpson Gears.

According to the GTS gear mesh as shown in FIG. 1, there is provided a carrier which is connected to a turbine shaft 2 through a spline and a pair of planetary gears 6 (S1 and S2) are provided. The planetary gears S1 and S2 are provided as one body at both ends of several axes. The planetary gear S, which is provided to one axis, has many saw teeth and the planetary gear S1, which is provided to the other axis, has relatively small saw teeth.

A ring gear 5 is meshed with the planetary gear S2 at an outside thereof and a reverse sun gear 8(A2) is meshed with the planetary gear S2 at an inside thereof. A transmission sun gear 7(A1) is meshed with the planetary gear S1 at an inside thereof. A hydraulic motor 9 is engaged with the outside of an axis of the transmission sun gear 7 through a spline so that the transmission sun gear 7 is driven by the hydraulic motor 9 with an individual rotation power in order to perform the transmission.

If the turbine shaft 2 rotates, the planetary gears S1 and S2, which rotate and revolve on the axis of the transmission sun gear 7 (at this time, the reverse sun gear 8(A2) takes a free (independent) action), rotate the ring gear 5 and an increasing forward rotation is then outputted in a predetermined ratio. With the driving of the oil pressure motor 9, the transmission sun gear 7(A1) rotates so that the ratio of the increasing forward rotation is varied with a variable speed transmission. As a result, with the increase or decrease of the number of rotations of the transmission sun gear 7(A1), the transmission ratio is varied. Also, if the number of rotations of the transmission sun gear 7(A1) is fixed and the number of rotations of the turbine shaft 2 increases or decreases, the transmission ratio is varied, thereby to perform a doubled-continuously variable transmission.

Further, if the transmission sun gear 7(A1) is fixed with the individual rotation of the ring gear 5 (5, C), the planetary gears S1 and S2 rotate and revolve on the axis of the transmission gear 7 and rotate the reverse sun gear 8(A2), thereby to output reverse rotations in a predetermined decrease speed ratio. Typically, this decrease speed ratio is constant so that it acts as a fixed reduction gear.

As shown in FIG. 4, the turbine shaft receives a rotation power from an engine through a torque converter and an oil pump shaft directly receives a rotation power from an engine. Accordingly, in the present invention, the distributed rotation power on the turbine shaft takes an action to transmit a speed-changed rotation power to a dependently moving axis and the transmission sun gear 7(A1), as a subsidiary driving means, functions a change of the speed. Accordingly, at the time the transmission sun gear 7(A1) functions as the transmission, the power loss is minimized in combination with the main driving power.

Further, when the planetary gears S1 and S2 rotate and revolve on the axis of the transmission gear by means of the rotation of the carrier, the rotation power of the transmission sun gear 7(A1) is induced and, accordingly, the present invention is characterized in that the rotation of the transmission sun gear 7(A1) can be controlled by a little amount of about 1/150 of the input power.

The mechanism of the continuously variable transmission according to the present invention will be described in detail referring to FIGS. 2A to 2F. As the conventional gear mechanism, gears moves based on a cloudy contact of the pitch circles of the gear and, when two gears are in contact with each other, the change of rotation angle can be obtained.

Figure 2A:
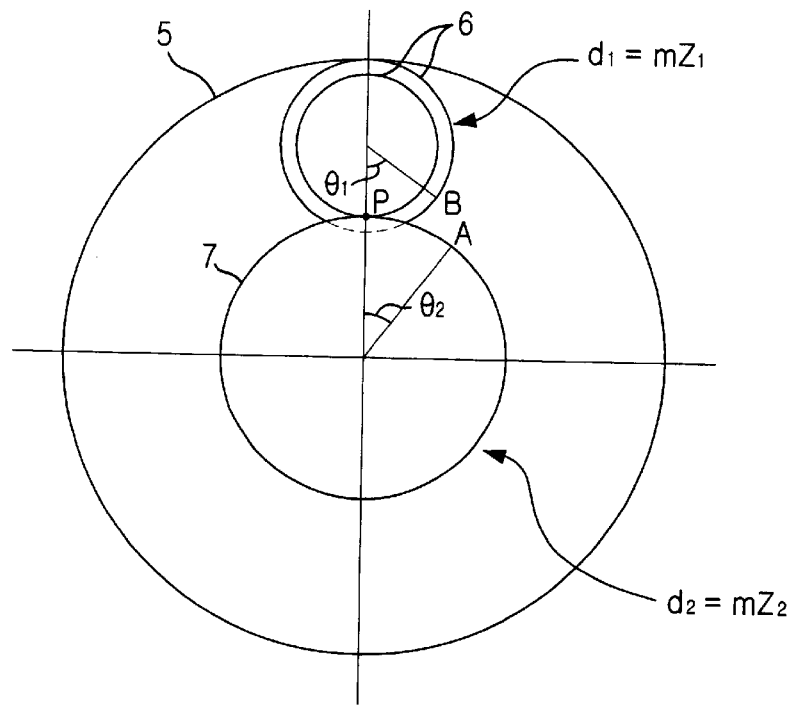
FIGS. 2A to 2F are schematic views illustrating operation the gear mesh in FIG. 1.

Referring to FIG. 2A, at the initial state, point A and point B are in the same position, point P. The circular arc PA should be the same as the circular arc PB due to the cloudy movement of the pitch circle. Accordingly, the following equation is given by:

$$cir.arcPA = cir.arcPB \quad \frac{d_1}{2}\theta_1 = \frac{d_2}{2}\theta_2 = \theta_1 Z_1 = \theta_2 Z_2 \qquad \text{[Equation 1]}$$

where m denotes a module, Z1 and Z2 denote the number of teeth of the gear and d1 and d2 denote the pitch circle.

The planetary gears should be taken into consideration in their rotation as well as in the movement of center thereof.

Figure 2B:
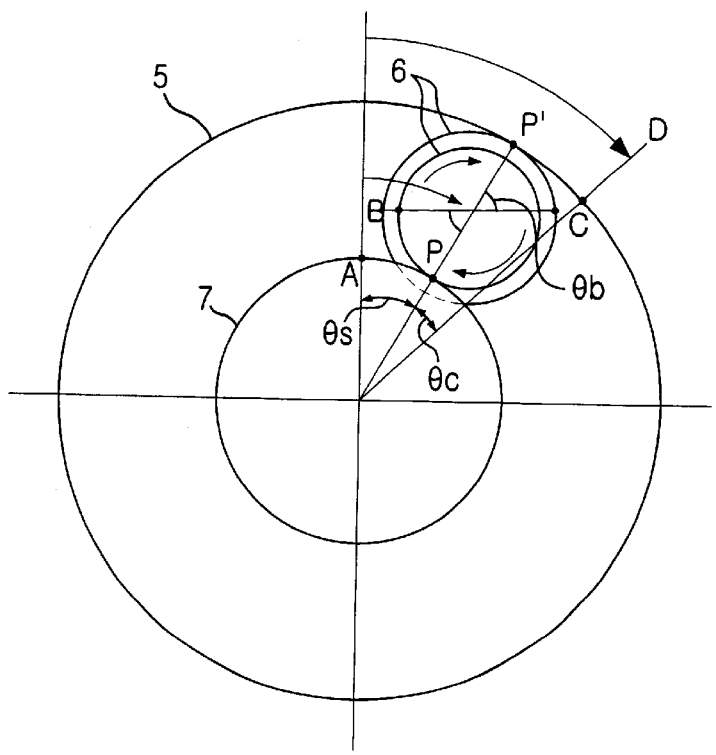

Referring to FIG. 2B, in case where the planetary gears are fixed and the carrier is rotated, points B and C on the pitch circle of the planetary gear are in contact with point A on the pitch circle of the sun gear and point D on the pitch circle of the ring gear, respectively, at the initial state and these contact points corresponds to the pitch points.

from that of the sun gear). If the movement in FIG. 2B is superimposed on that in FIG. 2C when the carrier and the sun gear are respectively rotates by $\theta_s$ and $\theta_a$, the rotation angle ($\theta_c$) of the ring gear is given by:

Equation 7

| | Starting | Ending | Fixed | Angle ($\theta c$) |
|---|---|---|---|---|
| 1) | Carrier($\theta$s) | Ring gear($\theta$c) | Sun Gear($\theta$a) | $(\overline{\theta_c}) = \left(\dfrac{Z_a}{Z_c} + 1\right)\theta_s$ |
| | *acceleration in the same direction | | | |
| 2) | Carrier($\theta$a) | Ring gear($\theta$c) | Sun Gear($\theta$c) | $(\overline{\theta_c}) = -\dfrac{Z_a}{Z_c}\theta_a$ |
| | *deceleration in the reverse direction | | | |

When the carrier rotates by $\theta$s, point C on the pitch circle of the planetary gear and point D on the pitch circle of the ring gear are respectively shown in FIG. 2B. At this time, the circular arc P'C should have the same length as the circular arc P'D under the condition of the cloudy contact.

$$\begin{pmatrix} P'C = \dfrac{1}{2}mZ_b\theta_b \\ P'D = \dfrac{1}{2}mZ_c\theta_c \end{pmatrix} \Rightarrow \theta_c = \dfrac{Z_b}{Z_c}\theta_b \quad \text{[Equation 2]}$$

Accordingly, the total rotation angle ($\theta_c$) is given by:

$$\overline{\theta_c} = \theta_c + \theta_x = \left(\dfrac{Z_b}{Z_c}\dfrac{Z_a}{Z_b} + 1\right)\theta_s = \left(\dfrac{Z_a}{Z_c} + 1\right)\theta_s \quad \text{[Equation 3]}$$

Figure 2C:
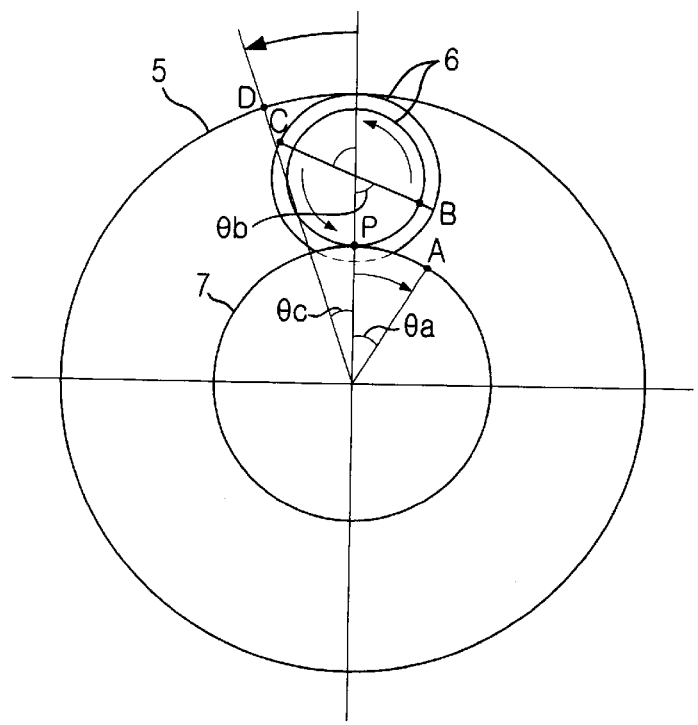

FIG. 2C is a schematic view showing a gear mechanism when the carrier is fixed and the sun gear rotates. At the initial state, points A, B, C and D are disposed in a straight line. When the sun gear rotates by ($\theta_a$), the rotation angle ($\theta_b$) of the planetary gear is given by:

$$cir.arcPA = cir.arcPB \quad \theta_b = \dfrac{Z_a}{Z_b}\theta_a \quad \text{[Equation 4]}$$

At this time, the rotation angle ($\theta_c$) of the ring gear is given by:

$$P'C = P'D \quad \theta_c = \dfrac{Z_b}{Z_c}\theta_b = \dfrac{Z_a}{Z_c}\theta_a \quad \text{[Equation 5]}$$

That is, the above rotation angle is the total rotation angle because the carrier does not rotate.

$$\overline{\theta_b} = \theta_b = \dfrac{Z_b}{Z_c}\theta_a \quad \text{[Equation 6]}$$

$$\overline{\theta_c} = -\dfrac{Z_a}{Z_c}\theta_a$$

Figure 2D:
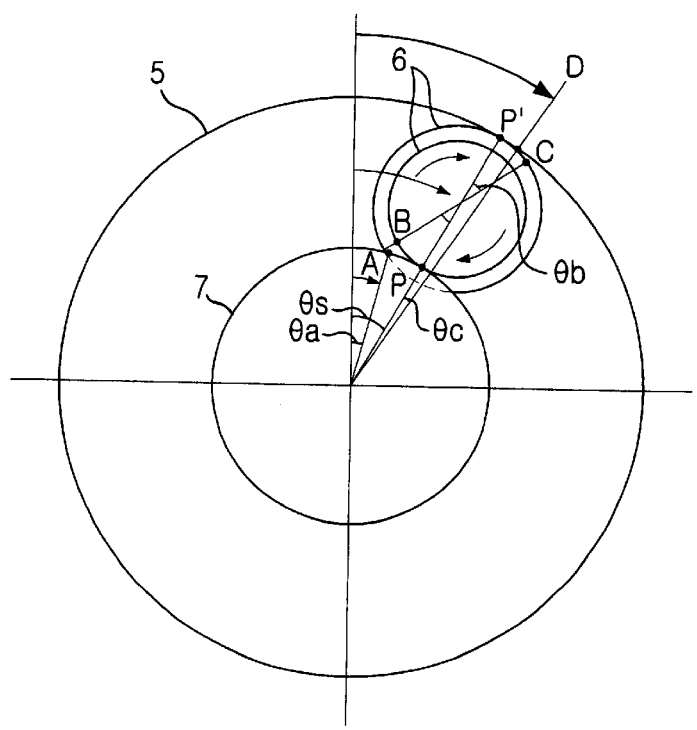

FIG. 2D is a schematic view showing a gear mechanism when both the carrier and the sun gear simultaneously rotates (the number of rotations of the carrier is different When the carrier and the sun gear rotate clockwise by $\theta$s and $\theta$a, the rotation angle ($\theta_c$) of the ring gear is given by:

$$\overline{\theta_c} = \left(\dfrac{Z_a}{Z_c} + 1\right)\theta_s - \dfrac{Z_a}{Z_c}\theta_a \quad \text{[Equation 8]}$$

For the gear ration of $$i_o = \dfrac{Zc}{Za}\Bigg\vert 1,$$

Equation 8 can be rewritten as follow:

$$\overline{\theta_c} = \dfrac{(1 + i_o)\theta_s - \theta_a}{i_o} \quad \text{[Equation 9]}$$

Considering rpm (n), the number of rotations can be expressed as follow:

$$n_c = \dfrac{(1 + i_o)n_s - n_a}{i_o} \quad \text{[Equation 10]}$$

The angular velocity $$\left(\varpi = \dfrac{2\pi n}{60}\right)$$

can be expressed as follow:

$$\omega_c = \dfrac{(1 + i_o)\omega_s - \omega_a}{i_o} \quad \text{[Equation 11]}$$

When the number of teeth of the ring gear is 73 and the number of teeth of the planetary gear is 19, the gear ratio $$\left(i_o = \dfrac{\omega_c}{\omega_a}\right)$$

is 2.0857.

In FIG. 2B, when the sun gear is fixed and the carrier rotates, the angular velocity can be expressed as follow:

$$\frac{\omega_c}{\omega_s} = \frac{1+i_o}{i_o} = \frac{1+2.0857}{2.0857} = 1.4794(0.6759) \qquad \text{[Equation 12]}$$

*acceleration in the same direction

FIG. 2B shows the planetary gear in which the acceleration ratio is 0.675. As shown in FIG. 2C, when the carrier is fixed and the sun gear rotates, the angular velocity can be expressed as follow:

$$\frac{\omega_c}{\omega_a} = \frac{73}{75} = 2.0857 \qquad \text{[Equation 13]}$$

* deceleration in the reverse direction

As shown in Equation 13, the deceleration ration is 1/2.0875.

FIG. 2D is a schematic view showing the gear mechanism when FIG. 2B is superimposed on that in FIG. 2C. When the carrier as a main driving force rotates and the sun gear, as a subsidiary driving force, rotates, the angular velocity can be expressed as follow:

$$\omega_c = \frac{(1+i_o)\omega_s - \omega_a}{i_o} \qquad \text{[Equation 14]}$$

According to the above equation,
input shaft carrier: 1000 rpm
transmission carrier: 1950 rpm
output ring gear:

1. $\frac{(1+2.0857)1000 - 1950}{2.0857} = 420.7$ rpm, deceleration ratio = 1/2.376

2. $\frac{(1+2.0857)1001 - 1950}{2.0857} = 422.3$ rpm, deceleration ratio = 1/2.370

3. $\frac{(1+2.0857)1000 - 1951}{2.0857} = 420.1$ rpm, deceleration ratio = 1/2.380

At the time the number of rotations of the sun gear increases by 1 RPM, the speed reduction rate increase by 0.004 and, at the time the number of rotations of the carrier on the turbine shaft increases by 1 RPM, the acceleration ratio increase by 0.006.

Namely, when the number of rotations of the sun gear increases, the speed reduction rate increase and, when the number of rotations of the carrier connected to the turbine shaft increases, the double transmission to promote the acceleration ratio is achieved. Accordingly, the transmission rate can increase or decrease with a continuously variable transmission by controlling the number of rotations of the sun gear. As a result, it is possible to achieve the continuously variable transmission with the timely and pliably optimized transmission rate.

Further, it is easy to think that power loss is fairly generated because the number of rotations of the transmission sun gear is higher than that of the turbine shaft; however, the transmission sun gear rotates in the same direction as the input shaft with an action of deceleration. For example, the number of actual rotations required for the transmission may be 455.4 rpm when the deceleration ratio of 1/2.0857 is considered, exclusive of the number of rotations of the input shaft. Accordingly, it is not extinguished after the transmission, but is distributed to the main driving shaft of the turbine and the subsidiary driving shaft of the transmission sun gear so that it respectively performs different functions and then is outputted to the output shaft without a power loss. The power required to rotate the transmission sun gear is in proportion to the input power (torque) and such a power is transmitted to the transmission sun gear when the planetary gears engaged with the turbine shaft rotates and revolves round the transmission sun gear as a center and then the transmission sun gear rotates in the same direction as the planetary gears. Also, it is possible to rotate the transmission sun gear at a little torque, which is about 1/150 of the input power. Accordingly, it is possible to control a large torque using a little torque, thereby performing the transmission. The hydraulic motor for the subsidiary driving force is installed within the gearbox and it operates based on an oil pressure from an oil pump. Further, the number of rotations of the hydraulic motor is controlled by an amount of oil through a servo valve and the servo valve is also controlled by a transmission control unit (TCU).

Figure 2E:
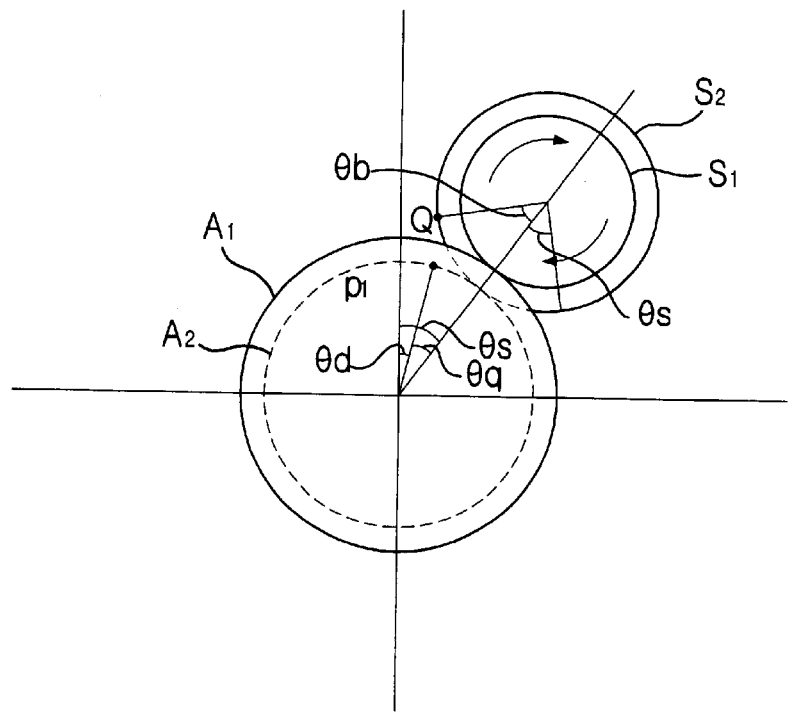
Figure 2F:
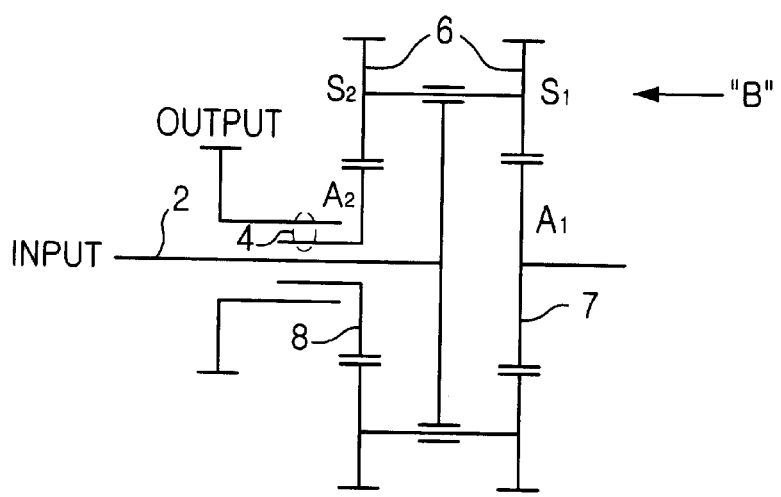

FIGS. 2E and 2F are schematic views illustrating a system to reduce a reverse rotation. As shown in FIGS. 2E and 2F, the planetary gear S1 and S2 reduce the reverse rotation of the reverse sun gear 8, rotating and revolving on the axis of the transmission sun gear 7 (at this time, the ring gear takes an independent and free action). As a result, the planetary gear S1 and S2 functions as a reverse apparatus to, take an action of a reduced and fixed reverse speed. This action is expressed as follows:

$$i_o = \frac{Z_{S1}Z_{A2}}{Z_{A1}Z_{S2}} \qquad \text{[Equation 15]}$$

$$\frac{\omega_{A1}}{\omega_S} = -\frac{1-i_o}{i_o}$$

As illustrated above, the gear mesh of the transmission according to the present invention is definitely different from that of the conventional transmission.

The Ravigneaux Gears and Simpson Gears have been used as a typical planetary gear mesh. In case of the Ravigneaux Gears, one ring gear is meshed in a body with two planetary gears, which are supported by a carrier and have the same number of teeth at the same axis. One of the planetary gears is meshed with the ring gear on an inner surface of the ring gear and is also meshed with the transmission sun gear opposite to the ring gear. The other is meshed with an idle gear and this idle gear is also meshed with another sun gear having the small number of teeth. As a result, the Ravigneaux Gears includes one ring gear, two planetary gears having the same number of teeth, and two sun gears which have the different number of teeth to be meshed with the idle gears.

In case of the Simpson Gears, one straight gear is provided as a sun gar. Further, a planetary gear set having small number of teeth and a ring gear and a planetary gear set having large number of teeth and a ring gear are provided in the Simpson Gears. Accordingly, one sun gear, two sets of planetary gears and two ring gears are meshed with each other. Clutch and break systems are set up at each axis of the gears so that the transmission is preformed by four or five clutch operations (On-OFF) from a gear of a high deceleration ratio to a gear of a low deceleration ratio. Finally, the two conventional transmissions are not a non-step transmission.

However, in the continuously variable transmission according to the present invention, the planetary gears S1 and S2, each of which has different teeth, are provided as one body at one side of the transmission gearbox. The planetary gear S2 having the large number of teeth is meshed with the ring gear for the forward rotations at an outside thereof and is meshed with the reverse sun gear 8 having the small number of teeth at an inside thereof. Also, on the opposite of the planetary gear S2, the planetary gear S1 having the small number of teeth is meshed with the transmission sun gear 7 at an outside thereof and the axis of the transmission sun gear is engaged with the hydraulic motor 9 in order to control the number of rotations of the transmission sun gear. Accordingly, when the planetary gear transmits power to the ring gears, the continuously variable transmission with no step is achieved, being dependent on the increment or decrement of the number of rotations of the transmission sun gear.

As a result, the gear mesh according to the present invention includes one ring gear 5, a plurality of planetary gears 6 (S1 and S2) provided on the same axis as one body with the different number of teeth, the transmission sun gear 7 and the reverse sun gear 8, each of which has the different number of teeth, and the hydraulic motor 9 to control the rotation of the transmission sun gear 7.

Especially, in the gear mesh according to the present invention, the rotation power of the planetary gears is obtained by distributing the main rotation power through the input shafts and the subsidiary driving force to be transmitted to the axis of the hydraulic motor 9 is used for transmission. That is, the main and subsidiary driving force is combined to produce one output so that there is no a power loss in rotating the transmission sun gear associated with the subsidiary driving force.

Accordingly, as compared to the conventional gear mesh, such as the Ravigneaux Gears and of the Simpson Gears, the gear mesh according to the present invention has an excellent operation features.

Figure 3:
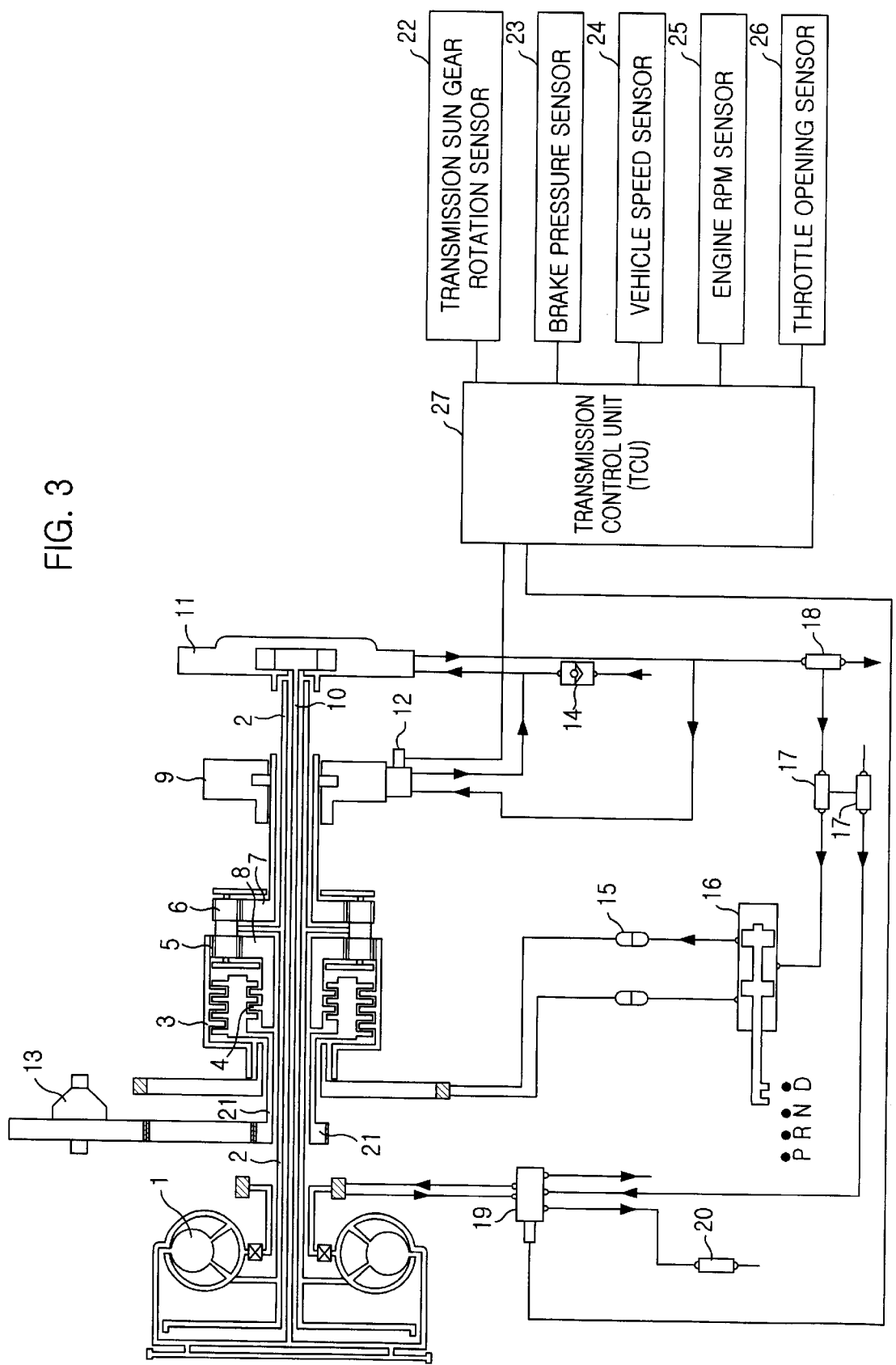
FIG. 3 is a view illustrating the case in which a continuously variable transmission for vehicles is applied to a vehicle equipped with a well-known power generating device, a hydraulic pressure forming and supplying device, a wheel driving device adapted to drive wheels, and an electronic control device for electronically controlling the entire operating part of the vehicle, in order to explain respective connections of the continuously variable transmission with elements of the vehicle and associated operating states.

FIG. 3 is a view illustrating the case in which the continuously variable transmission for vehicles is applied to a vehicle equipped with a well-known power generating device, a hydraulic pressure forming and supplying device, a wheel driving device adapted to drive wheels, and an electronic control device for electronically controlling the entire operating part of the vehicle, in order to explain respective connections of the continuously variable transmission with the elements of the vehicle and associated operating states.

In FIG. 3, the reference numeral 1 denotes a torque converter, 2 a turbine shaft for providing a main-drive rotating force, 3 a forward clutch, 4 a reverse clutch, 5 a ring gear, 6 a planetary gear set, 7 a transmission sun gear, 8 a reverse sun gear, 9 a hydraulic motor for providing a sub-drive rotating force to the transmission sun gear, 10 an oil pump shaft, 11 an oil pump, 12 a servo valve (electronically-proportional flow control valve), 13 a differential gear, 14 a check valve, 15 an accumulator, 16 a manual valve, 17 a regulator, 18 a relief valve, 19 a relay valve, 20 a bypass valve, 21 an output shaft, 22 a transmission sun gear rotation sensor, 23 a brake pressure sensor, 24 a vehicle speed sensor, 25 an engine RPM sensor, 26 a throttle opening sensor, and 27 a transmission control unit (TCU). In FIG. 3, the same element as that of FIG. 1 is denoted by the same reference numeral.

As illustrated above, the continuously variable transmission of the present invention receives a rotating force generated from the power generating device, and outputs the received rotating force to the wheel driving device while performing a non-step speed change for the rotating force. This continuously variable transmission includes a carrier connected to the turbine shaft 2 included in the power generating device and adapted to rotate (revolve) a plurality of planetary gear sets while supporting those gear sets. In the illustrated case, two planetary gear sets S1 and S2 having the different number of teeth are supported by the carrier in an assembled state such that they can rotate freely. These planetary gear sets S1 and S2 are also included in the continuously variable transmission. The continuously variable transmission further includes a first output unit meshed with the planetary gear set having a larger tooth number, that is, the planetary gear set S2, outside the arrangement of the planetary gear set S2, and adapted to transmit a rotating force inputted thereto to an output-stage shaft, a second output unit meshed with the planetary gear set S2 inside the arrangement of the planetary gear set S2, and adapted to transmit a rotating force inputted thereto to the output shaft, and a transmission unit meshed with the planetary gear set having a smaller tooth number, that is, the planetary gear set S1, inside the arrangement of the planetary gear set S1, and adapted to perform a speed change operation while rotating in the same direction as the carrier.

The connection of the carrier with the turbine shaft 2, which is an input-stage shaft, is achieved in a splined fashion.

The first output unit includes the ring gear 5 meshed with the planetary gear set S2 having the larger tooth number outside the arrangement of the planetary gear set S2 such that it rotates along with the planetary gear set S2, and the forward clutch 3 for selectively connecting the ring gear 5 to the output-stage shaft. The second output unit includes the reverse clutch 4 meshed with the planetary gear set S2 having the larger tooth number inside the arrangement of the planetary gear set S2 such that it rotates along with the planetary gear set S2. The transmission unit includes a transmission sun gear 7 meshed with the planetary gear set S1 having the smaller tooth number inside the arrangement of the planetary gear set S2 such that it rotates along with the planetary gear set S1, and the hydraulic motor 9 for providing power so as to allow the transmission sun gear 7 to rotate in the same direction as the carrier or to be maintained in a stopped state.

The transmission unit operates to achieve a non-step speed change between the input and output stages in accordance with a variation in the rotating speed of the hydraulic motor 9 in an output mode in which outputting of power is achieved through the first output unit, that is, a normal rotation mode. In an output mode in which outputting of power is achieved through the second output unit, that is, a reverse rotation mode, the transmission unit operates to stop the hydraulic motor 9, thereby maintaining the transmission sun gear 7 in a stopped state, so as to achieve a fixed speed change between the input and output stages in accordance with the tooth number ratio between the gears. In the normal rotation mode in which the output of power is achieved through the first output unit, the main-drive rotating force provided through the turbine shaft 2 of the input stage and the sub-drive rotating force provided through the hydraulic motor 9 are composed as they pass through the above described non-step speed change procedure, and then applied to the output-stage shaft in the composed state.

The transmission sun gear 7 is driven by a rotating force generated in the revolving direction of the associated planet gears when the planet gears transmits a rotating force while performing rotation and revolution about the axis of the transmission sun gear 7, and a sub-drive rotating force provided by the hydraulic motor 9. Accordingly, even when the sub-drive rotating force is considerably smaller than the main-drive rotating force, it is possible to achieve a desired rotation control for the transmission sun gear in order to achieve a desired non-step speed change.

The hydraulic motor 11 is driven by hydraulic pressure supplied from the oil pump 11 included in the well-known hydraulic pressure forming and supplying device driven by the power generating device, without using any additional power generating device. The pressurized oil discharged from the hydraulic motor 9 is guided to the sucking inlet of the oil pump 11 by the check valve 14 installed at the sucking inlet of the oil pump 11, so as to minimize loss of power. The well-known hydraulic pressure forming and supplying device includes the servo valve 12 in order to finely control the RPM of the hydraulic motor 9. The servo valve 12 is controlled by a control signal generated from the TCU of the electronic control device. The RPM of the hydraulic motor 9 is also controlled by a control signal generated from the TCU. The electronic control device performs a control operation for sensing the internal pressure of a master cylinder included in the power generating device when a braking operation is carried out, calculating the sensed internal pressure using the TCU, and performing an increase in speed reduction ratio proportional to the sensed pressure, thereby allowing an engine brake force to be generated.

FIG. 4 is a graph for comparing the operating characteristics of the transmission for vehicles according to the present invention with those of conventional transmissions.

Referring to the graph, it can be seen that the transmission of the present invention can provide an optimum speed change ratio under diverse running conditions from a low vehicle speed to a high vehicle speed and at diverse engine outputs, thereby achieving a reduced consumption of fuel, as compared to the conventional transmissions (5-stage speed change). The non-step transmission of the present invention can be applied to all machines requiring an appropriate speed change of power generated from a main power source in a given situation. For example, the non-step transmission of the present invention can be applied not only to vehicles, but also to heavy equipment, rail vehicles, and vessels.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the non-step transmission of the present invention using a meshed gear arrangement provide an effect of performing a non-step speed change the running condition of, for example, a vehicle, thereby allowing the engine of the vehicle to usually operate within an optimum fuel consumption rate range irrespective of the running speed of the vehicle.

Accordingly, it is possible to control, in a real time fashion, the engine to be in a maximum output state or in a minimum fuel consumption state. It is also possible to transmit the drive force of the engine to the road surface even in a speed changing state. An improvement in acceleration performance is achieved because speed change can be achieved over a wide range. Furthermore, there is no impact generated during a speed changing operation.

The continuously variable transmission of the present invention is configured to appropriately vary its control operation in accordance with the kind of the applied vehicle by simply modifying the program stored in the transmission control unit equipped in the vehicle. Thus, the continuously variable transmission of the present invention can be used for general purposes, thereby preventing an increase in expenses due to duplicated development.

Moreover, it is possible to achieve a reduced consumption of fuel while achieving an improvement in engine output. In addition, an improvement in transmission efficiency is achieved by virtue of a reliable non-step transmission operation achieved using a meshed gear arrangement.

What is claimed is:

1. A continuously variable transmission in which a rotation power is transmitted with non-step from an input shaft to an output shaft, comprising:

a carrier means engaged with said input shaft, wherein said carrier means rotates by a turbine shaft;

a plurality of sets of planetary gears supported by said carrier means, wherein said planetary gear sets freely rotate in one body and wherein the number of teeth of one of said planetary gear sets is smaller than that of the other of said planetary gear set;

a first output means meshed with said planetary gears having the large number of teeth at an outside thereof;

a second output means meshed with said planetary gears having the large number of teeth at an inside thereof; and a transmission means meshed with said planetary gears having the small number of teeth at an inside thereof and rotating in the same direction as said carrier means.

2. The continuously variable transmission in accordance with claim 1, wherein said input shaft is mechanically connected to said carrier means through a spline.

3. The continuously variable transmission in accordance with claim 1, wherein said first output means includes:

a ring gear meshed with said planetary gears having the large number of teeth at an outside thereof; and a forward clutch connecting said ring gear to said output shaft.

4. The continuously variable transmission in accordance with claim 1, wherein said second output means includes:

a reverse sun gear meshed with said planetary gears having the large number of teeth at an inside thereof; and a reverse clutch connecting said reverse sun gear to said output shaft.

5. The continuously variable transmission in accordance with claim 1, wherein said transmission means includes:

a transmission sun gear meshed with said planetary gears having the small number of teeth at an inside thereof; and a hydraulic motor providing a subsidiary driving force to make said transmission sun gear rotate in the same direction as said carrier means or make said transmission sun gear rotate stop.

6. The continuously variable transmission in accordance with claim 5, wherein said transmission means is positioned between said input and output shafts in order that a speed change is achieved by a rotation speed of said hydraulic motor at a forward rotation of said first output means, and wherein said transmission means is positioned between said input and output shafts in order that a constant speed is maintained through a stop of both said hydraulic motor and said transmission sun gear at a reverse rotation of said second output means.

7. The continuously variable transmission in accordance with claim 6, wherein said first output is engaged with said output shaft in order that a main driving force from said input shaft and a subsidiary driving force from said planetary gears combined with a change of speed.

8. The continuously variable transmission in accordance with claim 6, wherein said transmission sun gear is meshed with said planetary gears having the small number of teeth in order that said transmission sun gear rotates by both a rotation power which is caused by said planetary gears in the same direction and a rotation power which is caused by said hydraulic motor.

9. A continuously variable transmission for a vehicle, wherein said vehicle comprising a power generation means, a hydraulic means, a wheel driving means, a control means to control said vehicle, said continuously variable transmission comprising:

a carrier means engaged with a turbine shaft, wherein said carrier means rotates by said turbine shaft;

a plurality of sets of planetary gears supported by said carrier means, wherein said planetary gear sets freely rotate in one body and wherein the number of teeth of one of said planetary gear set is smaller than that of the other of said planetary gear set;

a first output means meshed with said planetary gears having the large number of teeth at an outside thereof;

a second output means meshed with said planetary gears having the large number of teeth at an inside thereof; and a transmission means meshed with said planetary gears having the small number of teeth at an inside thereof and rotating in the same direction as said carrier means.

10. The continuously variable transmission in accordance with claim 9, wherein said turbine shaft is mechanically connected to said carrier means through a spline.

11. The continuously variable transmission in accordance with claim 9, wherein said first output means includes:

a ring gear meshed with said planetary gears having the large number of teeth at an outside thereof; and a forward clutch connecting said ring gear to said output shaft.

12. The continuously variable transmission in accordance with claim 9, wherein said second output means includes:

a reverse sun gear meshed with said planetary gears having the large number of teeth at an inside thereof; and a reverse clutch connecting said reverse sun gear to said output shaft.

13. The continuously variable transmission in accordance with claim 9, wherein said transmission means includes:

a transmission sun gear meshed with said planetary gears having the small number of teeth at an inside thereof; and a hydraulic motor providing a subsidiary driving force to make said transmission sun gear rotate in the same direction as said carrier means or make said transmission sun gear rotate stop.

14. The continuously variable transmission in accordance with claim 13, wherein said transmission means is positioned between said input and output shafts in order that a speed change is achieved by a rotation speed of said hydraulic motor at a forward rotation of said first output means, and wherein said transmission means is positioned between said input and output shafts in order that a constant speed is maintained through a stop of both said hydraulic motor and said transmission sun gear at a reverse rotation of said second output means.

15. The continuously variable transmission in accordance with claim 14, wherein said first output is engaged with said output shaft in order that a main driving force from said input shaft and a subsidiary driving force from said planetary gears combined with a change of speed.

16. The continuously variable transmission in accordance with claim 15, wherein said transmission sun gear is meshed with said planetary gears having the small number of teeth in order that said transmission sun gear rotates by both a rotation power which is caused by said planetary gears in the same direction and a rotation power which is caused by said hydraulic motor.

17. The continuously variable transmission in accordance with claim 13, wherein said hydraulic motor is mechanically connected to said hydraulic means in order to obtain a rotation power.

18. The continuously variable transmission in accordance with claim 17, wherein said hydraulic means includes a check valve installed at a sucking inlet of an oil pump in order to flow oil from said hydraulic motor into said sucking inlet of said oil pump.

19. The continuously variable transmission in accordance with claim 17, wherein said hydraulic means includes a servo valve in order to finely control rotation of said hydraulic motor.

20. The continuously variable transmission in accordance with claim 19, wherein said servo valve is controlled by a signal from a transmission control unit, controlling the number of rotation of said hydraulic motor.

21. The continuously variable transmission in accordance with claim 20, wherein said transmission control unit senses an internal pressure of a master cylinder, increases a deceleration ratio of said vehicle based on the sensed pressure so as to allow an engine brake force to be generated.

22. A method for meshing gears for a continuously variable transmission in which a rotation power is transmitted with non-step from an input shaft to an output shaft, the method comprising the steps of:

engaging a carrier means with said input shaft, wherein said carrier means rotates by a turbine shaft;

providing a plurality of sets of planetary gears supported by said carrier means in order that said planetary gear sets freely rotate in one body, wherein the number of teeth of one of said planetary gear set is smaller than that of the other of said planetary gear set;

providing a first output means meshed with said planetary gears having the large number of teeth at an outside thereof;

providing a second output means meshed with said planetary gears having the large number of teeth at an inside thereof; and providing a transmission means meshed with said planetary gears having the small number of teeth at an inside thereof and rotating in the same direction as said carrier means.

* * * * *